July 30, 1957
P. K. SCHILLING
CUP-SHAPED ARTICLES, AND METHOD
AND APPARATUS FOR MAKING THEM
2,800,945
Filed Feb. 20, 1952
4 Sheets-Sheet 1
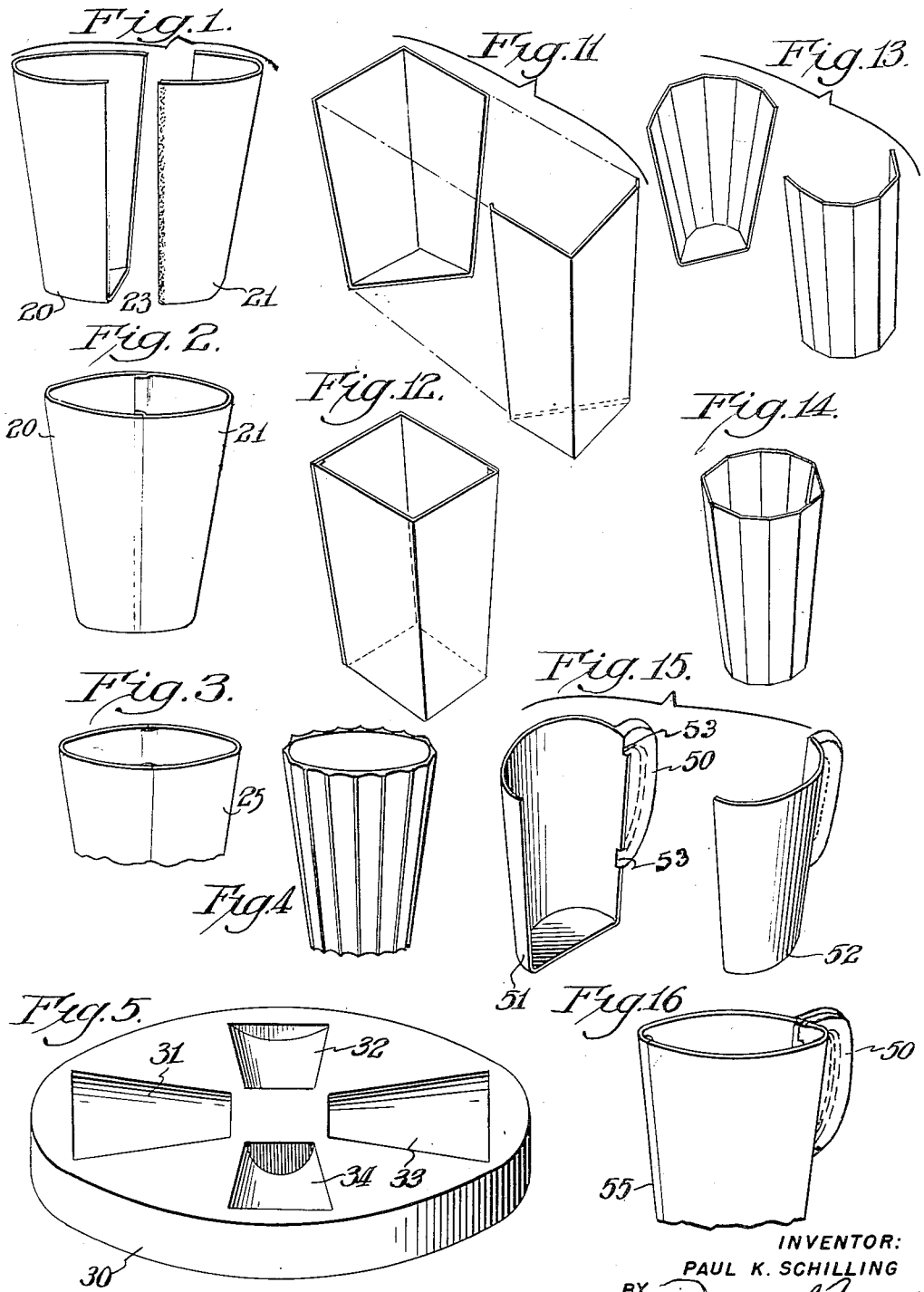
INVENTOR:
PAUL K. SCHILLING
BY
HIS ATTORNEY

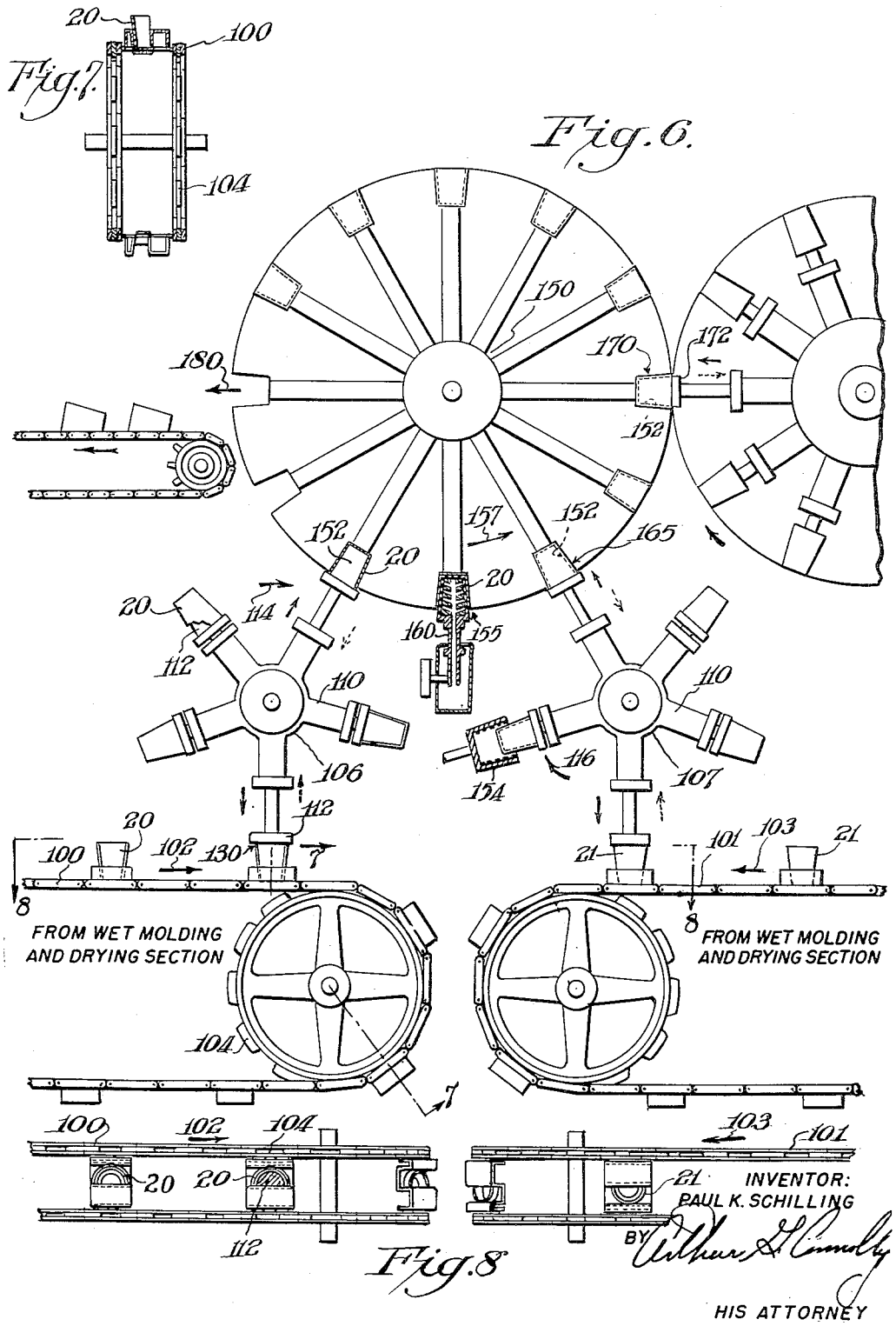

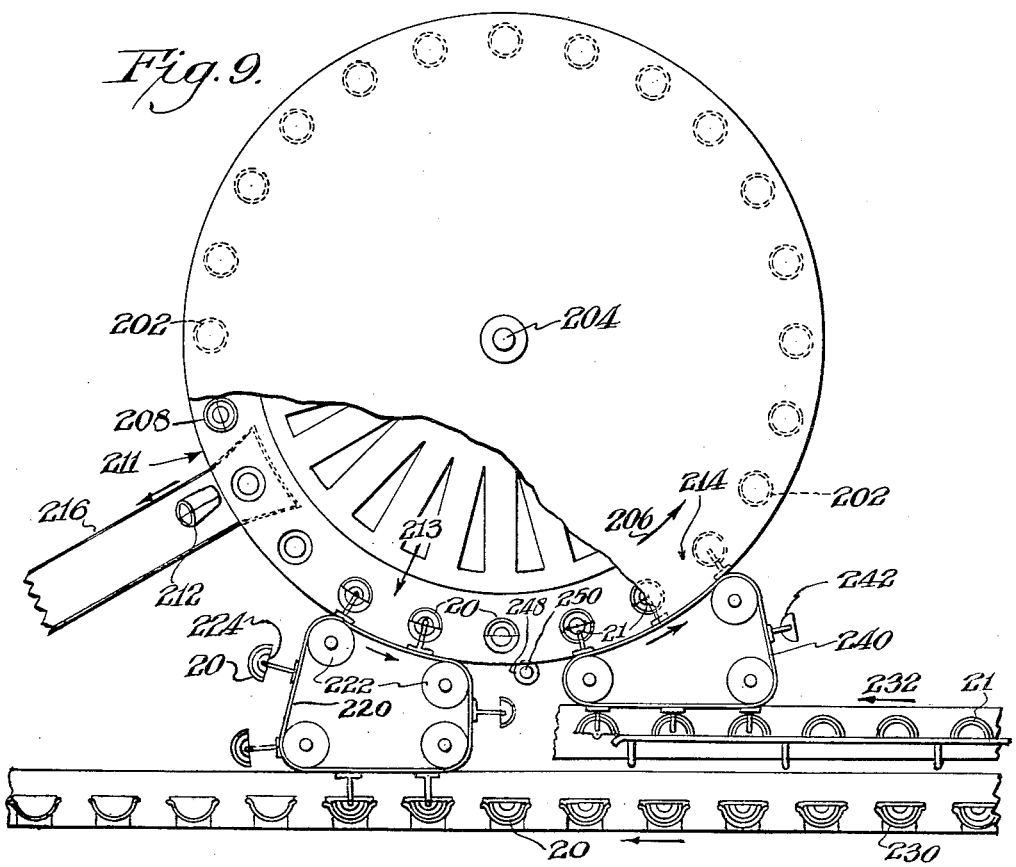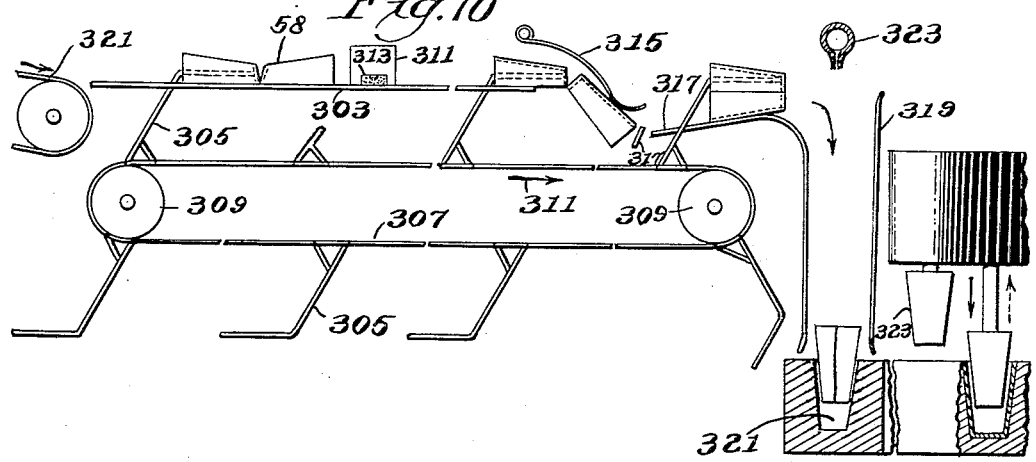

July 30, 1957  P. K. SCHILLING  2,800,945
CUP-SHAPED ARTICLES, AND METHOD
AND APPARATUS FOR MAKING THEM
Filed Feb. 20, 1952  4 Sheets-Sheet 4
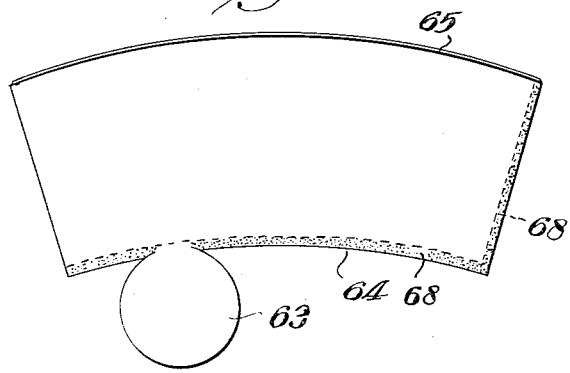
Fig.18.
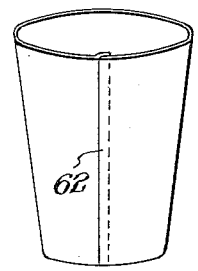
Fig.19.
Fig.17.
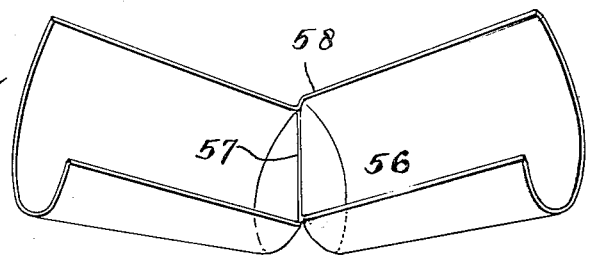
Fig.17a.
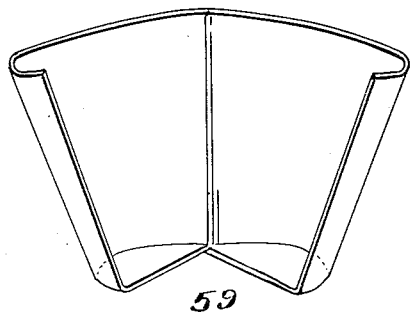
INVENTOR:
PAUL K. SCHILLING
BY
HIS ATTORNEY

United States Patent Office 2,800,945
Patented July 30, 1957

2,800,945

CUP-SHAPED ARTICLES, AND METHOD AND
APPARATUS FOR MAKING THEM

Paul K. Schilling, North Vassalboro, Maine

Application February 20, 1952, Serial No. 272,533

8 Claims. (Cl. 154—1)

This invention relates to deep walled or cup-shaped articles, more particularly those made of molded fibrous pulp. Such articles are ordinarily used as drinking cups or the like and may be of the single-use type intended to be discarded after that use.

The above types of articles ordinarily have a height and width that render them unsuited to any appreciable manipulation while in unsupported condition during the intermediate steps of the manufacture when they are wet and relatively limp. As a result it has been necessary to effect the drying of the wet-molded mass while they are supported on the expensive and carefully tooled molds with which they are initially formed. This unduly ties up the most expensive portions of the apparatus since the drying generally takes about ten times as long as the forming.

In addition to the above, molded articles having a depth such as is required for cups or other containers of this type, are impractical to form on a molding machine operating in a continuous, that is non-intermittent, manner. By reason of the relatively deep draw which formed layers of pulp require in pressing, transferring, etc., in order to make such containers, it has heretofore been advisable to operate reciprocating plungers between pressing units that have to be momentarily halted to give the plungers sufficient time to reciprocate.

The above difficulties are most pronounced with cup shapes having fairly steep walls at least about two inches high.

Among the objects of the present invention is the provision of novel cup-shaped articles as well as methods and apparatus for making them, in which the above disadvantages are avoided.

Further objects of the present invention include the provision of a cup-shaped article, and methods and apparatus for making them, in which the articles are made in split form and put into the finished condition by a final pressing operation.

The above, as well as additional objects of the present invention, will be more readily understood from the following description of several of its exemplifications, considered in conjunction with the appended drawings wherein;

Figs. 1 and 2 are perspective views of two longitudinally split sections of a drinking cup showing one way of assembling the cup-shaped articles of the present invention;

Fig. 3 is a perspective view with parts broken away of the cup Figs. 1 and 2 after a final pressing is completed;

Fig. 4 is a view similar to Fig. 3 of a modified form of cup embodying the present invention;

Fig. 5 is a perspective view of one type of mold in which the sections of Fig. 1 are made in accordance with the present invention;

Fig. 6 is a schematic showing of one form of apparatus with which the steps of Figs. 1, 2 and 3 can be effected;

Figs. 7 and 8 are sectional views of the apparatus of Fig. 6 taken along lines 7—7 and 8—8 respectively;

Fig. 9 is a somewhat diagrammatic plan view of a different form of a pressing apparatus embodying the present invention;

Fig. 10 is a schematic side view of the essential details of a further uniting apparatus illustrating the inventon;

Figs. 11 and 12, as well as 13 and 14 along with 15 and 16, are pairs of views similar to Figs. 1 and 3 showing steps in the manufacture of modified forms of cup-shaped articles of the present invention;

Figs. 17 and 17a illustrate further cup making techniques exemplifying the present invention; and Figs. 18 and 19 show an initial blank and a final cup of a still further modification of the invention.

In accordance with the present invention cup-shaped articles are molded in split form from fibrous pulp, and the split form is completed by a shaping and pressing operation that produces the finished article. The intermediate split form, which can be in one or more separate or attached sections, is so shaped that it can be dried on a simple support without undergoing an undue amount of deformation.

Referring to Figs. 1, 2 and 3, the first of these figures shows two sections 20, 21 corresponding approximately to a vertically split form of the desired final cup. Each section 20, 21 is separate and is separately formed as by conventional fiber molding apparatus and methods, shown for example in Chaplin Patent No. 2,163,585, granted June 27, 1939. After the sections are individually molded they are individually dried as by carrying them on a conveyor through a suitably elongated tunnel. Although the free drying that takes place on such a conveyor belt leads to some warpage of the sections, the degree of warpage is not serious. Apparaently because of the relatively small height of each section when lying on its split edge, and the generally arched shape of the sections, they will in this position be fairly effectively supported by a flat conveyor belt and will show no great tendency to flatten out or collapse.

After drying, a layer of adhesive is applied at those portions of either or both of the sections where they overlap when placed in mating relationship, and the sections assembled as shown in Fig. 2 for the final pressing step. In the form shown in Figs. 1, 2 and 3 the layer of adhesive can conveniently be a marginal strip indicated in Fig. 1 at 23. The assembled section indicated in Fig. 2 can then be subjected to a pressing operation between suitably shaped male and female dies. This pressing effects an accurate shaping of the final cup to thereby counteract any warping that the section may have suffered, and in addition causes the molded fibers in the overlapping section-joining seams to be permanently joined by the adhesive and hold the sections in final form. Where the molding is sufficiently severe, the wall thickness of the overlapping seam areas is greatly reduced and substantially all trace of the seams can be completely smoothed out so that the final cup is as shown at 25 in Fig. 3. However, this is not necessary and the retention of at least some of the bulging seam portion is preferred where the final cup is desired to have maximum rigidity. In fact, the entire outer surface of the cup can be covered with a plurality of ribs similar to the seam rib so that the seam is not easily discovered. This construction is shown in Fig. 4.

Another feature of the final pressing operation is that it imparts a smooth texture to the surface of the finished article and presses out all coarseness or fussiness that may be present in the free dried sections 20, 21.

Because of the relatively shallow nature of the individual sections 20, 21 as viewed from their split edges, the wet molding operation for forming these sections is very readily carried out in substantially the same manner shown in the above-mentioned Chaplin patent, the details of which are hereby incorporated in the present specification as though fully set forth herein. However, instead of providing individual molds for each section, a large mold can be simultaneously used to form a group of sections. Fig. 5 shows one example of such a collective mold 30 with 4 mold cavities 31, 32, 33, 34, each shaped to provide an individual one of the sections 20 and/or 21. The mold 30 can be of the perforated-base wire-mesh-covered construction indicated for example in Shepard Patent No. 2,192,937, granted March 12, 1940, or the laminated construction shown in Sheffield Patent No. 1,984,384, granted December 18, 1934, or the laminated construction as shown in Louisot Patent No. 2,129,697, granted September 13, 1938.

Figs. 6, 7 and 8 show one type of automatic machine suitable for use to effect the final pressing disclosed above. In this machine a pair of feed conveyors 100, 101 are arranged to carry a succession of the separate cup sections 20, 21 in the directions indicated by the arrows 102, 103 from the wet molding and drying sections. Positioned in the path of movement of each conveyor is a turret-transfer unit 106, 107. Both of these units carry a multiplicity of radially projecting arms 110, each provided with a telescopingly extensible and retractable male die 112 as shown in more detail in Randall et al. Patent No. 2,183,859, granted December 10, 1939. The arms of each unit are rotated in the direction shown by arrows 114, 116. The conveyors 100, 101 are driven and synchronized with the turret-transfer units so that a cup section 20 is carried to a transfer position indicated generally at 130 at the same time as one of the turret arms. While so positioned, the male die on this arm is extended to press into this section, after which the die is retracted to carry back the section with the section properly positioned on the die.

To aid in this transfer of the section, the dies 112 can be perforated and provided with suction and blowing apparatus such as shown for example in the above-mentioned Chaplin patent. Suction is then applied when the die engages section 20 and causes the section to be sucked on the die and be carried around with it. Transfer unit 106 then rotates to the step where its next arm has its die 112 actuated to receive and carry the next section 20 brought by the conveyor, and these steps are continued in succession. Transfer unit 107 operates in a similar manner to pick up the sections 21 from conveyor 101.

Cooperating in synchronized relation with transfer turrets 106, 107 is an assembling turret 150 shown as carrying a multiplicity of cup-shaped perforated female dies 152 and as rotating in the direction of arrow 157. In the position shown in Fig. 6 a male die on turret 106 is aligned with one of the female dies 152. As so located, the section so carried by the male die is transferred to the female die by projecting and retracting of this male die. Where suction is used by the turret 106 to hold its transferred section, this suction is cut off when the transfer to the turret 150 is made. This transfer is further facilitated by the application of air pressure through the perforation of die 112 to blow the cup section into place. At the same time suction can be used with turret 150 to hold the transferred section 20 in the female die.

After the transfer to die 152, the turret 150 steps around to the position indicated at 165. Here the mating section 21 which is picked up from conveyor 101 by transfer turret 107 in a manner similar to that of transfer unit 106, is pushed into mold 152 and suitably positioned in overlapping relation with the first mold section 20. These steps are repeated in succession so that as turret 150 rotates in the direction of arrow 157 the suction molds 152 are each fitted with an assembly of properly positioned sections. Upon reaching position 170 the molds 152 are brought into cooperative operation with a final pressing die plunger 172 which is also shown to be extensible and retractable. This plunger coacts with die 152 to adhere the overlapping portions of the sections together and complete the formation of the final article.

Adhesive can be externally applied to one of the mating sections before they are assembled. A sprayer 154 can for example be positioned so that during the rotation of turret 107 the outer surface of a section 21 is presented to receive a spray of adhesive 23 at the seam overlap portion as indicated in Fig. 1 for example. Sprayer 154 can be pivotally or retractably mounted and connected to automatically move out of the path of the arms 110 when this turret is stepped forward. Alternatively, the arms 110 can be arranged to automatically project out the section carrying molds as they reach the spray position, and the sprayer then merely fixed in place to receive the projecting section and apply an adhesive spray to it.

However, the adhesive can also be applied to the inner surface of a section 20 in a die 152 before the mating section 21 is pushed in over it. As shown at position 155, a retractable spray head 160 can be arranged for this purpose. Both of the above adhesive applications can be used together, or either can be used by itself.

If desired, the adhesive 23 need not be applied by a separate operation but can be incorporated in the molded sections as for example in the form of resin size included in the pulp slurry from which the sections are first molded. For this purpose about 1 to 25% of the usual phenol-formaldehyde, urea-formaldehyde, melamine - formaldehyde, amine-aldehyde, amine-phenol-formaldehyde, alkyd, glyptal, shellac, lignin and cellulosic resins are suitable. In general any thermosetting or thermoplastic resin with adhesive qualities can be used. Some resin size can advantageously be added to the slurry even when external adhesive is to be applied.

The finished cups can be unloaded as by having them blown out of the mold 152 when it reaches an unloading position indicated at 180, or by having them transferred during the pressing to pressing plunger 172 and then moving the plunger over to an unloading position where the cup it carries can be dropped or blown off. For the latter type of unloading it is convenient to have the pressing plunger in the form of a turreted group as indicated in the figure. The unloading can then be accomplished at a suitably spaced portion of the turret rotation.

The final pressing of the present invention can be effected with molded sections having a moisture content of from about 5 to about 35% based on the dry weight. Where appreciable amounts of resin are incorporated with the molded fibers, less moisture can be present. In any event, the amount of moisture should take into account any liquid applied with the adhesive at the overlapped portions. Should the sections be delivered by the drier with too low a moisture content for satisfactory final pressing, moisture can be added using any of the perforated dies, the adhesive applicator, or a separate moisture applying station similar to the adhesive applicator for example.

The final pressing machine shown above can be subjected to considerable modification in accordance with the present invention. Thus the transfer turrets can be arranged to cooperate with a portion of the conveyor that is supported on the reversing roller 104 or other suitable backing element to provide more positive engagement of the transfer dies 112 with the sections to be transferred. In addition, a propelling agent such as an air jet can be arranged to lift the sections from the conveyor and hold them on the pick-up die. Such a transfer jet can also be arranged to carry the sections, particularly in inverted condition on the reversing roller, directly from the conveyor to the final assembling turret 150. For this purpose the conveyors can be placed adjacent the top of the assembling turret, and on its opposite sides. The transfer turrets can also be used with such an arrangement so that the sections are assembled in the upper flight of the assembling turret and need not be accurately supported in inverted dies from which the sections tend to fall under the influence of gravity.

According to a further modification a plurality of treatment steps with pressing dies or plungers 172 can be used to provide additional compression and/or drying. Instead of merely multiplying the number of pressing stations, a series of these pressing dies can be mounted on an endless chain drive looped along a substantial portion of the assembling turret periphery. The chain is arranged with die guides to bring the dies into pressing engagement with the turret dies 152, to hold them so engaged for a substantial length of the turret travel, and then automatically retract them after which the retracted dies are recycled back to the engagement position.

According to the present invention the section uniting process can be accomplished in a continuous operation rather than in the intermittent steps as shown in connection with the apparatus of Figs. 6, 7 and 8. For this purpose a series of mating dies can be arranged in a circle extending in a plane at right angles to the direction in which the dies open and close. Such an arrangement is shown in the Randall Patent No. 2,346,608, granted April 11, 1944, and these dies can be connected for continuous rotation as a unit around the circle. At appropriate positions in the circular travel, the dies are connected to automatically receive the split blanks described above, and then automatically close again and subject the blanks through the remainder of the cycle to the desired pressing with or without the addition of heat. The pressed product can be discharged while the dies are open and before the next feeding is effected.

Fig. 9 shows the essential elements of such an apparatus of the present invention. An upper set of circularly disposed male dies 202 are shown as held as an assembled unit for rotation around the center of the circle 204 in a direction indicated by arrow 206. Below these male dies is a mating set of famale dies 203 correspondingly arranged for rotation along with dies 202. At the same time one of these circular rows of dies, the lower set for example, has its individual members vertically reciprocable as by means of a cam track and cam follower, not shown. At position 211 the reciprocating mechanism automatically opens the dies somewhat in advance of the location 213 where a transfer loop 220 guided around rollers 222 carries a set of section transfer dies 224 between the opened pressing dies 202, 208. Transfer loop 220 is driven in synchronism with the circularly disposed pressing dies and is also provided with automatic die lowering and raising elements which are conveniently in the form of an additional cam track (not shown).

When transfer dies 224 reach a position directly between a pair of open pressing dies, the transfer dies are automatically lowered to bring the section they carry into the female die 208 and to deposit it there. After this the transfer dies are raised to return to a position between the pressing dies and then continued around loop 220. This reciprocation can be effected by movement of the upper dies down over the transfer dies followed by lifting of the upper dies to permit the transfer dies to return upward as by return springs.

Cooperating with transfer loop 220 there is shown a conveyor 230 which is arranged as for example in the manner shown in Fig. 9 to carry a series of blanks 20 in the direction indicated by arrow 232. The rate of conveyor movement is correlated with the travel of transfer loop 220 for the purpose of bringing the sections 20 under the individual transfer dies 224 as these dies are carried around their loop. Automatic lowering and raising of the loop and the transfer dies it carries over the blanks will then enable the blanks to be picked up by the continually moving loop and thereby fed to the pressing dies.

A second transfer loop shown at 240 is similarly arranged to transfer a second set of pressing blanks 21 to the pressing dies after the first set has been loaded. Where external adhesive application is used, an applicator fountain or roller can be mounted as shown at 248 to present an applicator surface 250 in the path of blanks 21 as they are carried toward the pressing dies. By having the applicator surface 250 yieldably mounted, it can be arranged to first engage and apply adhesive to the external upper edge surface of the blank, and then to be cammed downward by the blank so that it follows the seam margin downwardly across the lower surface of the bottom and then up on the outer surface of the opposite wall of the blank. If desired, automatic retracting mechanism can be provided to keep the applicator surface 250 from engaging transfer dies 242 that are not loaded with blanks, as for example by shaping transfer dies 242, so that the blanks 21 project somewhat and actuate a sensing element which may be either of the mechanical or photo-electric types.

To reduce the possibility of improper feed to the pressing dies, additional sensing mechanism can be provided to indicate vacancies in the conveyor loading positions so that an attendant may fill these positions from a separate supply or remove the mating sections from the opposite feed in order to prevent the pressing of a single section.

After both mold sections have been loaded on the pressing dies, these dies are then arranged to automatically close as at position 214. From this position, the remainder of the pressing cycle which extends around to position 211 effects the desired pressing with or without heat and simultaneous drying. A discharge chute 216 is shown as positioned between locations 211 and 213, and the pressing dies are arranged to keep the pressed finished article on the upper die 202 after the dies separate. From the upper die, the completed articles are dropped at the proper time into the discharge chute 212 which carries them to subsequent handling or storage stations as for packaging, counting, seasoning, etc.

Instead of having the transfer loops 220, 240 arranged for vertically moving their transfer dies, these loops may be restricted to movement in a plane and the relative vertical motion supplied by the accompanying members. Thus, the retracted pressing die which is opened at position 211 can be arranged to automatically close to the extent required for receiving the transfer blank from loop 220, then again open to permit disengagement of this loop, followed by a repetition of partial up and down movement to receive a section from and clear the dies of transfer loop 240. Loading on the transfer loops can be effected by merely guiding conveyor 230 up to a peak at each loading station followed by a drop to clear the loop subsequent to loading. If desired the conveyor 230 may be split into parallel portions, each carrying one line of the blanks and separately peaked at only one location.

The various section transfer operations of the apparatus of Fig. 9 are simplified by the use of perforated dies and the application of compressed air or suction, or both, to assist in the desired transfer.

Figs. 11 and 12, as well as Figs. 13 and 14 show different forms of generally cup-shaped articles according to the present invention. These can be formed in the manner indicated above in connection with Figs. 1, 2 and 3.

Figs. 15 and 16 show a different embodiment of the present invention in which the cup-shaped article is provided with a handle 50. This handle can conveniently be formed on one or both of the sections 51, 52 as indicated in Fig. 15. Where the handle is formed in halves, one on each section, one of the halves may be positioned directly at the split edge, the other half being than set back from the mating edge by the width of the overlapping seam portion. This seam portion can be cut away where the handle half joins the body of the cup section, as indicated at 53, to simplify the molding of this section. By assembling and pressing the sections 51, 52 in the manner shown above, a final handle-equipped cup 55 is formed. To simplify the pressing operation, the handle 50 can be an unperforated type so as to provide an external support as a backing for the pressing of the portion of the seam on which the handle is carried. In fact, where two cemented handle halves are used, this cementing effectively acts as a seal for the adjacent margins of the cup sections 51, 52 and the seam overlap can be correspondingly omitted. If desired, the handle 50 can have its central portions of reduced wall thickness so as to form a better grip for the fingers. Such thickness reduction can be effected either in the original forming of the blanks, in the final pressing, or by an intermediate operation.

As an alternative construction of the present invention the central portions of the handle halves can be provided with a scored or perforated peripheral tear line so that the central portion can conveniently be punched or torn out after the pressing is completed to thereby provide a more conventional type of handle. This punching or tearing out operation can also be accomplished before the pressing operation or the sections 51, 52 can be initially formed with the open handle, but the final pressing of such an article generally calls for a female die with movable parts that automatically insert a filler in the handle opening to act as a backing for the pressing of the adjacent seam. This filler is then automatically retracted when the completely pressed cup is to be discharged.

Fig. 17 represents a modified and preferred exemplification of the invention. A cup-shaped article according to this exemplification is formed from a single split section or perform which includes all parts of the final cup yet which at the same time can be free dried without presenting excessive depth. As shown, the split perform 56 corresponds in shape to a cup that has been split along opposed portions of its side walls and folded open at a hinge line 57 across its bottom. To permit more ready overlapping when the preform is folded for the final pressing operation one edge of each side wall can have a small extension, indicated at 58 to provide some overlap for the final cementing. If desired, this extension can be provided on one edge of one side of the preform and the other edge of the other side or can be divided between each pair of mating edges. The split edges make very good supports on which the split preform is conveniently held for free drying without excessive warpage or sagging.

Fig. 10 schematically shows an apparatus for automatically cementing and finishing the preform of Fig. 17. According to this embodiment of the invention the preforms are fed as by conveyor 301 onto one end of a cementing platform 303. An endless series of impelling fingers 305 carried by a chain 307 looped around sprockets 309 and moving in the direction indicated by the arrows 311 catches the individual preforms by their folded hinge portion and impels them along platform 303. Both the platform and the conveyor are split longitudinally to provide a central passageway through which the fingers 305 can pass.

At 311 is a cementing station at which are located a pair of cement applicators, one on each side of platform 303. One of these applicators is shown in Fig. 10. A resiliently held dauber 313 supplied with cement in liquid form projects into the path of the impelled preforms 58 and dabs the cement over the outer surface of its lower margin, at the site of the overlap.

Beyond the cementing station, the preforms are impelled against a resilient arm 315 which pushes down against them, thereby folding the leading sections downwardly as indicated in the figure. The rear sections are held up by the fingers 305 and in moving further push back the arm 315. At about the same time the downwardly folded leading sections are impelled through a lateral constriction provided for example by a pair of laterally spaced bars 317 which cause this section to have its sides squeezed together and held back somewhat as the preform is moved through.

Continued travel of the preforms causes the leading sections, which are now sharply folded back, with their margins partially inserted into the margins of the rear sections, to be completely folded into place by an inclined guide 317.

The preforms are then deposited in a final pressing assembly, as by dropping them through aligning passageway 319 into a female die 321 a plurality of which may be provided in turret form in the manner indicated in Fig. 9 for example. A blast of air from nozzle 323 can be used to assure that the folded preforms disengage themselves from the moving fingers 305 which are recycled back by the chain 307 to repeat their impelling operation.

Male pressing dies 328 are then brought down into the preform-carrying female die to complete the cementing and make the finished article. The male dies are conveniently arranged in an endless series, the individual members of which are inserted into and move with the corresponding female dies, except at the loading station (passageway 319) where the male dies are automatically withdrawn from and shifted away from over the female dies in the manner shown for example in the Randall Patent 2,257,573, granted September 30, 1941. An unloading station at which the dies are also separated can be provided as in the construction of Fig. 9.

The cementing in the construction of Fig. 10 can be arranged either to extend over the outer marginal surfaces of both preform sections, or over only that section that is folded into the other. The latter modification is conveniently provided by interconnecting the daubers 313 with the drive for chain 307 so that they are automatically retracted after the leading section of each preform passes by.

Fig. 17a shows a further type of preform in accordance with the present invention. Here a single member is also used but in the form of a cup that has been split down one side wall and along its base, and folded open along the opposite side wall. One half or section of the preform can have its base portion offset as indicated at 59 slightly with respect to the base of the other half, and either or both of these base portions can be provided with extension lips to supply the overlapping seam construction. At the same time, the other dimensions of the two halves can also be correspondingly shifted so that when folded into pressing position the unpressed blank is substantially identical in shape to the final product and a minimum of reshaping is involved in the pressing. This preform can be finished into the final cup in a manner similar to that shown in Fig. 10, by appropriately disposing the cementing and folding structures.

Figs. 18 and 19 represent a different embodiment of the present invention. Here the intermediate form of the cup-shaped article is of substantially completely flattened construction represented by the molded fiber blank 60. This blank corresponds to a final cup with one wall split as indicated at 62, partially cut from the base 63 as indicated at 64, and then flattened out. Blank 60 is very conveniently manufactured either by the apparatus shown in the above Chaplin or Randall et al. patents, or by the conventional flat molding apparatus. For erection into the finished cup, a blank is merely forced into the final pressing die where it will automatically assume its proper shape. Adhesive, if separately applied, can be located as shown at 68 in Fig. 18.

One effective technique for providing the desired folding is by means of smoothly curving folding guides such as those used for examples in the standard type of carton-sealing apparatus. An impelling arm which con conveniently be of the suction cup holder type is arranged to engage the flat surface of cup bottom 63 and move this part into a female pressing die while at the same time tilting it up along the line at which it joins wall 65. During this movement, the sides of wall 65 are arranged to move along guides which cause these sides to fold around in overlapped ring-shaped position and follow the base 63 into the mold. At edge 64 the wall section 65 can be extended somewhat so that this portion overlaps the edge of base 63 during the folding. The impelling arm can then be disengaged and withdrawn, and a male pressing die inserted in its place to effect the final pressing operation.

The same folding technique can also be used with the blank of the type shown in Fig. 17a.

The handle construction variations described above in connection with Figs. 15 and 16 can, if desired, be provided in the preforms of Figs. 17, 17a and 18 and in exactly the same manner.

A feature of the present invention is that the angle between the wall and the base of the novel cup-shaped article described herein can be made anything up to and including a right angle. Prior art mold cups by reason of the difficulty in removing the wet, limp formed pulp mass from the forming die have heretofore been restricted to wall angles a substantial number of degrees from the perpendicular. Such prior art articles accordingly have a relatively squat shape sometimes considered undesirable, particularly in the larger sizes.

Another feature of the present invention is that it makes possible the inexpensive manufacture of relatively large containers of molded pulp. Of particular significance are quart size lubricating oil containers, milk bottles, and the like. To render the walls of such containers impervious to their contents, they can advantageously be lined or coated with resin films such as polyvinyl acetates, polyethylene, polyvinyl chlorides or other suitable thermoplastic or thermosetting resins.

As many apparently widely different embodiments of this invention may be made without departing from the spirit and scope hereof, it is to be understood that the invention is not limited to the specific embodiments hereof except as defined in the appended claims. By way of example the split lines along which the side walls of the cup are severed need not be perfectly aligned axially of the cup but can be directed in a plane tilted with respect to the cup axis.

What is claimed is:

1. A method of making a molded fibrous generally deep walled article, which method comprises molding from a fibrous slurry, and at least partially drying, a split form of the article, then overlapping portions of the dried form to produce an intermediate member having the approximate shape of the final article, and pressing the intermediate member to adherently join the overlapping portions and provide the finished article.

2. A method of making a molded fibrous elongated drinking cup, which method comprises wet molding a longitudinally split and unfolded integral cup preform, folding the preform into final form with overlaps at the split portions, and uniting the folded sections by pressing them together in aligned relation to adherently join the fibers of the different sections with each other into a permanent joint.

3. A method of making a molded fibrous elongated drinking cup, which method comprises separately wet molding longitudinally split halves of the cup, free drying the wet molded halves and uniting the dried halves by cementing and pressing them together in aligned relation to adherently join the fibers of the separate halves with each other into a permanent joint.

4. A method of making deep walled containers, which method comprises separately wet molding from a fibrous pulp slurry a pair of container halves corresponding approximately to vertically bisected halves of the desired container, free drying the wet molded halves, while lying on their bisected edges, to not more than about 30% moisture content, assembling the two halves with partial overlap and with adhesive between the overlapping portions into the desired container form, and finish-molding the assembled halves to compress and smooth out the overlapping portions, permanently unite the halves into the finished article and impart the proper shape and texture to this article.

5. A method of making a molded fibrous generally deep walled article, which method comprises molding from a fibrous slurry a split form of the article, then overlapping portions of the dried form to produce an assembled member having the approximate shape of the final article, and pressing the assembled member to adherently join the overlapping portions and provide the finished article.

6. In a machine for making cup-shaped molded pulp articles, a first conveyor for supplying a series of wet molded and at least partially dried concave article portions, a second conveyor for supplying a series of wet molded and at least partially dried complementary concave article portions, said second conveyor being so constructed and arranged that it supplies article portions positioned with their concavities facing in opposite directions from the concavities of the article portions supplied by said first conveyor, press structure constructed and arranged to juxtapose and partially overlap an article portion supplied by said first conveyor with an article portion supplied by said second conveyor into the shape of the desired article and adhesive applicator structure connected to introduce adhesive between the overlapped portions before they are overlapped, said press structure including mating mold members interconnected to compress the juxtaposed and overlapped portions for smoothing out the overlap, permanently uniting the pressed portions into the finished article and imparting the proper shape and texture to said article.

7. In an apparatus for making cup-shaped fibrous articles, pressing structure for pressing the articles in their final shape, supply mechanism connected for delivering longitudinally split preforms of the articles to the pressing structure, said supply mechanism including adhesive-applicator elements constructed and arranged to apply adhesive to the portions of the preform that are cemented together in the final article, and said pressing structure including a multiple mold assembly having pairs of male and female mold members with molding surfaces corresponding to those of the finished article, said assembly being in the form of a rotary press unit.

8. The apparatus of claim 7 in which the supply mechanism includes a folding unit for receiving an integral article preform, and folding it to substantially the final shape.

References Cited in the file of this patent

UNITED STATES PATENTS

| | | |
|---|---|---|
| 228,512 | Bray | June 8, 1880 |
| 307,486 | Mears | Nov. 4, 1884 |
| 496,131 | Peirce | Apr. 25, 1893 |
| 957,267 | Sowell | May 10, 1910 |
| 1,841,265 | Husa | Jan. 12, 1932 |
| 1,881,916 | Parker | Oct. 11, 1932 |
| 2,006,831 | Hawley | July 2, 1935 |
| 2,023,200 | Huff et al. | Dec. 3, 1935 |
| 2,163,585 | Chaplin | June 27, 1939 |
| 2,168,186 | Adamson | Aug. 1, 1939 |
| 2,257,573 | Randall | Sept. 30, 1941 |
| 2,321,574 | Chaplin | June 15, 1943 |
| 2,387,778 | Stocking | Oct. 30, 1945 |